(12) United States Patent
Schubert et al.

(10) Patent No.: US 8,974,627 B2
(45) Date of Patent: *Mar. 10, 2015

(54) CURABLE COMPOSITIONS CONTAINING SILYL GROUPS, AND USE THEREOF

(75) Inventors: Frank Schubert, Neukirchen-Vluyn (DE); Wilfried Knott, Essen (DE)

(73) Assignee: Evonik Degussa GmbH, Essen (DE)

( * ) Notice: Subject to any disclaimer, the term of this patent is extended or adjusted under 35 U.S.C. 154(b) by 532 days.

This patent is subject to a terminal disclaimer.

(21) Appl. No.: 13/322,468

(22) PCT Filed: Apr. 26, 2010

(86) PCT No.: PCT/EP2010/055502
§ 371 (c)(1),
(2), (4) Date: Nov. 25, 2011

(87) PCT Pub. No.: WO2010/136280
PCT Pub. Date: Dec. 2, 2010

(65) Prior Publication Data
US 2012/0067520 A1     Mar. 22, 2012

(30) Foreign Application Priority Data
May 25, 2009    (DE) .................. 10 2009 022 631

(51) Int. Cl.
| | | |
|---|---|---|
| C09J 7/02 | (2006.01) |
| C08F 220/12 | (2006.01) |
| C07F 7/08 | (2006.01) |
| C08L 83/00 | (2006.01) |
| C08G 77/04 | (2006.01) |
| C08G 77/46 | (2006.01) |
| C09J 183/04 | (2006.01) |
| C08G 77/16 | (2006.01) |
| C08L 83/06 | (2006.01) |
| C08L 83/04 | (2006.01) |
| C09D 183/04 | (2006.01) |

(Continued)

(52) U.S. Cl.
CPC ............... *C08G 77/46* (2013.01); *C09J 183/04* (2013.01); *C08G 77/16* (2013.01); *C08L 83/06* (2013.01); *C08L 83/04* (2013.01); *C09D 183/04* (2013.01); *C09J 183/06* (2013.01); *C09D 183/06* (2013.01); *C08B 15/05* (2013.01); *C08L 1/08* (2013.01)
USPC .............. 156/329; 524/858; 524/869; 528/33

(58) Field of Classification Search
USPC ....................... 156/329; 524/858, 869; 528/33
See application file for complete search history.

(56) References Cited

U.S. PATENT DOCUMENTS 3,388,079 A * 6/1968 Vandenberg ................... 528/27
5,371,161 A    12/1994 Knott (Continued)

FOREIGN PATENT DOCUMENTS

| EP | 1586597 | 10/2005 |
|---|---|---|
| EP | 2036938 | 3/2009 |
| EP | 2093244 | 8/2009 |

OTHER PUBLICATIONS

International Search Report for PCT/EP2010/055502 dated Sep. 21, 2010.

*Primary Examiner* — Michael Orlando
(74) *Attorney, Agent, or Firm* — Frommer Lawrence & Haug LLP

(57) ABSTRACT

This invention relates to curable compositions containing hydroxyl compounds that carry silyl groups as well as to the use of said compositions.

19 Claims, 3 Drawing Sheets

(51) Int. Cl.
*C09J 183/06* (2006.01)
*C09D 183/06* (2006.01)
*C08B 15/05* (2006.01)
*C08L 1/08* (2006.01)

(56) References Cited

U.S. PATENT DOCUMENTS

| | | |
|---|---|---|
| 5,430,166 A | 7/1995 | Klein et al. |
| 5,430,167 A | 7/1995 | Klein et al. |
| 5,455,367 A | 10/1995 | Klein et al. |
| 5,475,127 A | 12/1995 | Klein et al. |
| 5,981,812 A | 11/1999 | Knott et al. |
| 6,255,511 B1 | 7/2001 | Klein et al. |
| 6,291,622 B1 | 9/2001 | Droese et al. |
| 6,489,498 B2 | 12/2002 | Klein et al. |
| 6,521,771 B2 | 2/2003 | Knott et al. |
| 6,858,663 B2 | 2/2005 | Lehmann et al. |
| 7,018,458 B2 | 3/2006 | Lehmann et al. |
| 7,125,585 B2 | 10/2006 | Dudzik et al. |
| 7,157,541 B2 | 1/2007 | Pott et al. |
| 7,196,153 B2 | 3/2007 | Burkhart et al. |
| 7,598,334 B2 | 10/2009 | Herrwerth et al. |
| 7,612,158 B2 | 11/2009 | Burkhart et al. |
| 7,612,159 B2 | 11/2009 | Burkhart et al. |
| 7,619,035 B2 | 11/2009 | Knott et al. |
| 7,645,848 B2 | 1/2010 | Knott et al. |
| 7,754,778 B2 | 7/2010 | Thum et al. |
| 7,825,205 B2 | 11/2010 | Droese et al. |
| 7,825,206 B2 | 11/2010 | Knott et al. |
| 7,825,209 B2 | 11/2010 | Klein et al. |
| 2002/0161158 A1 | 10/2002 | Burkhart et al. |
| 2007/0128143 A1 | 6/2007 | Leidreiter et al. |
| 2009/0137751 A1 | 5/2009 | Knott et al. |
| 2009/0137752 A1 | 5/2009 | Knott et al. |
| 2010/0022435 A1 | 1/2010 | Knott et al. |
| 2010/0041910 A1 | 2/2010 | Knott et al. |
| 2010/0056649 A1 | 3/2010 | Knott et al. |
| 2010/0071849 A1 | 3/2010 | Knott et al. |
| 2010/0081781 A1 | 4/2010 | Knott et al. |
| 2010/0105843 A1 | 4/2010 | Knott et al. |
| 2010/0113633 A1 | 5/2010 | Hubel et al. |
| 2010/0168367 A1 | 7/2010 | Knott et al. |
| 2010/0184913 A1 | 7/2010 | Lehmann et al. |
| 2010/0249339 A1 | 9/2010 | Dudzik et al. |
| 2010/0266518 A1 | 10/2010 | Thum et al. |
| 2010/0292357 A1 | 11/2010 | Knott et al. |
| 2010/0298455 A1 | 11/2010 | Dudzik et al. |
| 2011/0021693 A1 | 1/2011 | Dudzik et al. |
| 2011/0034576 A1 | 2/2011 | Thum et al. |
| 2011/0042004 A1 | 2/2011 | Knott et al. |
| 2011/0046305 A1 | 2/2011 | Knott et al. |

\* cited by examiner

Figure 1:
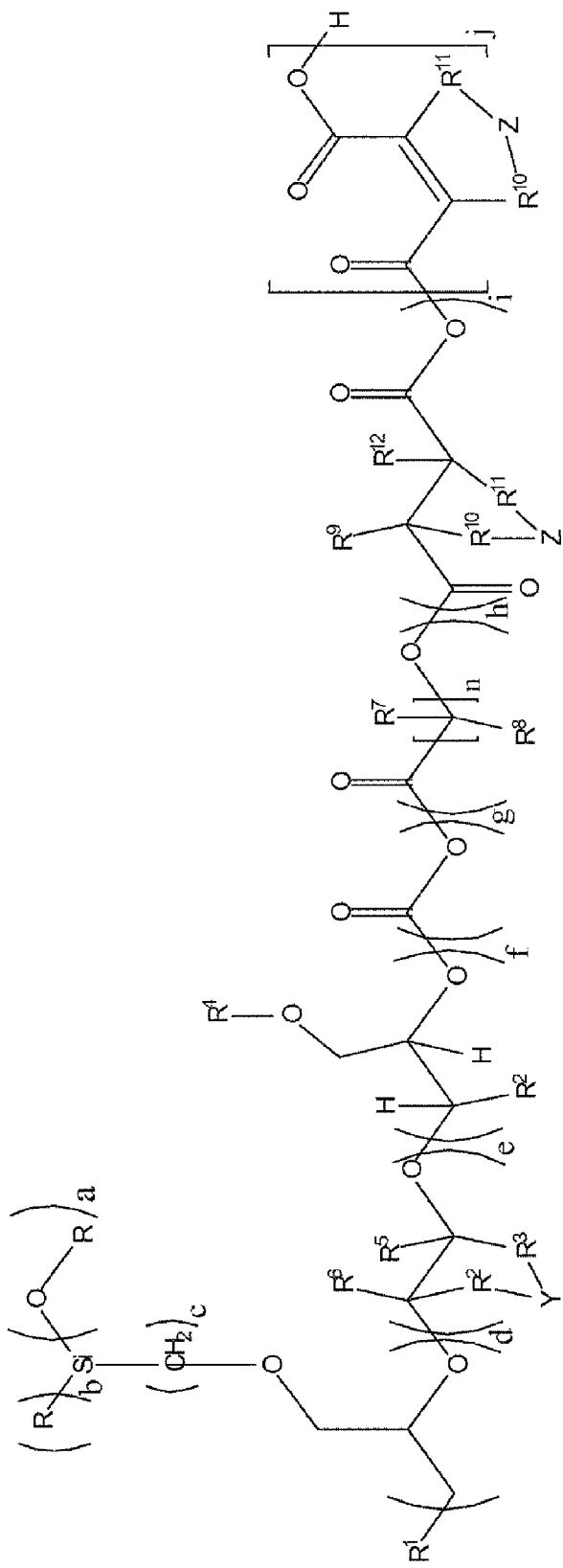

Figure 1: Structure of the formula (1)

Oscillation rheology studies of SP-1, blend 1 and blend 2 in comparison

Figure 3: Oscillation rheology studies of SP-1 and blend 3 in comparison
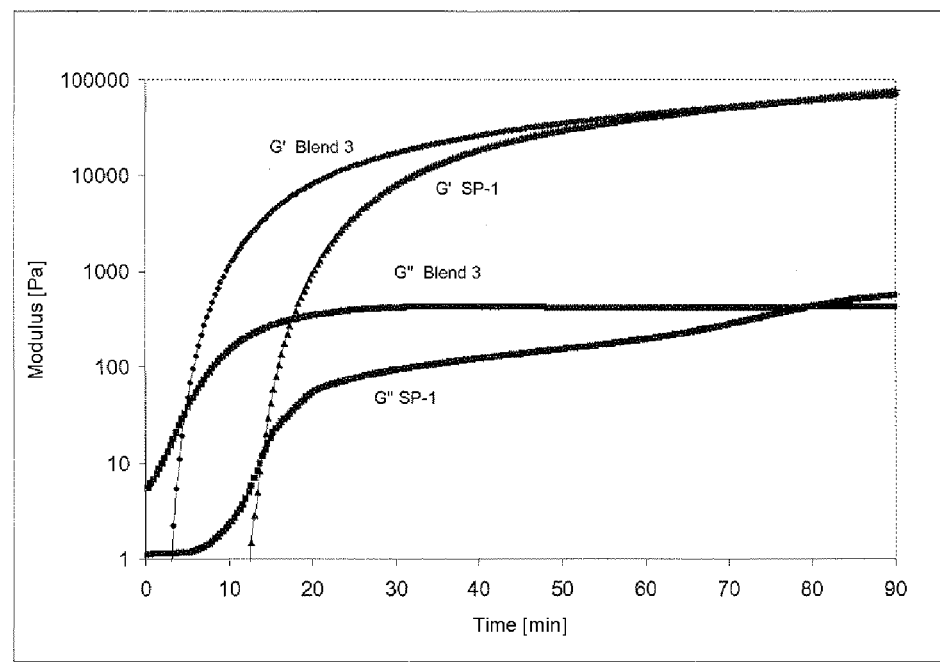

CURABLE COMPOSITIONS CONTAINING SILYL GROUPS, AND USE THEREOF

The invention relates to curable compositions comprising hydroxyl compounds which bear silyl groups, and to the use thereof.

Hydroxyl compounds which bear silyl groups and are used in the context of this invention are understood to mean reaction products which can be prepared by alkoxylation of epoxy-functional silanes over double metal cyanide catalysts by the process described in document DE 10 2008 000360.3, which was yet to be published at the priority date of the present application. These products are referred to hereinafter as silyl polyethers 1. A silyl group in the context of this invention is characterized by different or identical organic or oxyorganic radicals.

coating compositions which are completely free of isocyanates or else at least partly replace them.

Prepolymer systems which possess reactive alkoxysilyl groups have been known for some time and are frequently used for production of elastic sealants and adhesives in the industrial and construction sector. In the presence of air humidity and suitable catalysts, these alkoxysilane-terminated prepolymers are capable even at room temperature of condensing with one another to eliminate the alkoxy groups and form an Si—O—Si bond. It is thus possible to use these prepolymers, inter alia, as one-component systems which have the advantage of simple handling, since there is no need to meter in and mix in a second component.

Terminally alkoxysilane-functional polyurethanes which crosslink via a silane polycondensation have also likewise been known for some time. A review article on this topic can Formula 1

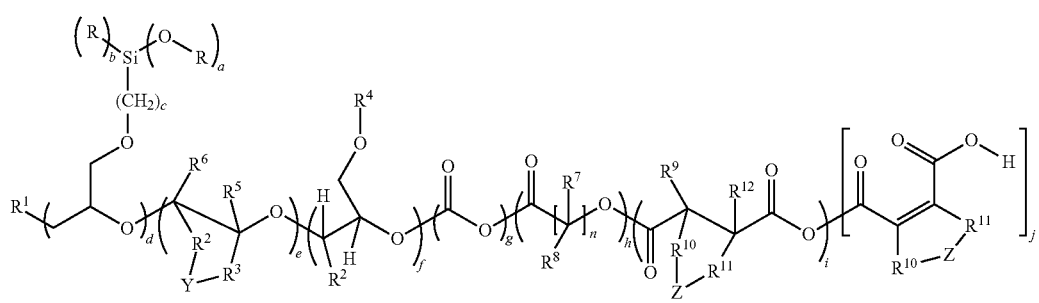

Silylpolyether 1

In the context of this invention, the term "polyethers" includes polyethers, polyetherols, polyether alcohols, polyether esters, but also polyether carbonates, which may be used synonymously with one another. It is not necessary that the expression "poly" must go hand in hand with a multitude of ether functions or alcohol functions in the molecule or polymer. Instead, this merely indicates that at least repeat units of individual monomers or else compositions which have a relatively high molar mass and additionally also a certain polydispersity are present.

The word fragment "poly" in the context of this invention does not encompass exclusively compounds having at least 3 repeat units of one or more monomers in the molecule, but especially also those compositions of compounds which have a molecular weight distribution and possess a mean molecular weight of at least 200 g/mol. This definition takes account of the fact that, in the field of industry in question, it is customary to define such compounds as polymers even if they do not appear to satisfy a polymer definition analogous to OECD or REACH guidelines.

In the field of adhesive bonding or coating of sheetlike structures, various efforts have been made to arrive at controlled-setting systems which exhibit optimized curing/setting characteristics depending on the field of use.

The isocyanate-based systems which are used for adhesive bonding/coating of surfaces with formation of polyurethanes have fallen into disrepute due to the toxicological concerns about isocyanates, and have to be replaced in some cases. Various ways of doing this have been proposed. One way is to protect the isocyanate group and convert it in situ only during the crosslinking/polymerization, by using allophanate or biuret structures; another way is to use novel adhesive and be found, for example, in "Adhesives Age" Apr. 1995, pages 30 ff. (authors: Ta-Min Feng, B. A. Waldmann). Such alkoxysilane-terminated, moisture-curing one-component polyurethanes are increasingly being used as flexible coating, sealing and adhesive compositions in the construction industry and in the automotive industry.

Such alkoxysilane-functional polyurethanes can be prepared according to U.S. Pat. No. 3,627,722 or U.S. Pat. No. 3,632,557, by, for example, first reacting polyether polyols with an excess of polyisocyanate to give NCO-containing prepolymers which are then reacted further with an amino-functional alkoxysilane. The alkoxysilane-functional prepolymers which form contain urea and urethane groups in high concentration, which lead to a high viscosity of the products.

Allophanates are prepared in industry by the reaction of a mono- or polyhydric alcohol with large amounts of excess aromatic, aliphatic and/or cycloaliphatic diisocyanate (cf. GB A 994 890, U.S. Pat. No. 3,769,318, EP A 0 000 194 or EP A 0 712 840). Here, exclusively di- or polyisocyanates are used in order to obtain, in turn, an isocyanate-functional binder. In order to prevent premature crosslinking, it is necessary to use an excess of polyisocyanate, which has to be removed by means of distillation under reduced pressure on completion of urethanization and allophanatization. In this concept, a further isocyanate group is bonded as a functional group via the allophanate nitrogen. The fact that polyisocyanates with allophanate structures are of relatively low viscosity compared to analogs without allophanate structures has been described on various occasions in the literature, for example in EP A1 0 682 012. It is likewise possible to prepare allophanates indirectly, from isocyanate derivatives other than urethanes and isocyanates. For instance, EP A 0 825 211 describes a process for forming allophanate structures from oxadiazinetriones; a further route is the opening of uretdiones (cf. Proceedings of the International Waterborne, High-Solids, and Powder Coatings Symposium 2001, 28, 405-419 and US-A-2003 0153713) to give allophanate structures. However, both routes require upgraded raw materials as starting material and lead merely to an allophanate product rich in by-products. Also, exclusively at least difunctional polyisocyanates are used in the formation of the precursors. The use of monoisocyanates has also already been disclosed in connection with allophanate chemistry. In applications U.S. Pat. No. 5,663,272 and U.S. Pat. No. 5,567,793, phenyl isocyanate is used in order to arrive at, after reaction with a polyfunctional alcohol, a urethane free of NCO and OH groups, which is subsequently modified by allophanatization with specific MDI products to give a liquid MDI polyisocyanate. In this procedure, the product comprises monomeric diisocyanate before the further processing.

WO 2007/025667 additionally describes polyurethane prepolymers which have modified alkoxysilane groups and are said to have a distinctly reduced viscosity. However, a disadvantage in the case of these prepolymers is the relatively low density of functionalization which is provided for crosslinking.

The reactivity of the capped isocyanates with biuret or allophanate structure is understandably much lower compared to the free isocyanates, but can be optimized for the application by addition of suitable catalysts. Accordingly, a further advantage of alkoxysilane-functional prepolymers consists in the fact that neither acids nor oximes or amines are released in the course of curing. In addition, unlike in the case of isocyanate-based adhesives or sealants, no gaseous $CO_2$ forms, the formation of which would result in subsequent expansion of the adhesive composition after the bonding of components. Furthermore, alkoxysilane-functional prepolymer mixtures, unlike isocyanate-based systems, are toxicologically safe.

A particularly widespread type of alkoxysilane-functional prepolymers is that of alkoxysilane-terminated prepolymers. These can be formed from different starting materials. These prepolymers typically have an organic backbone, i.e. they are formed, for example, from polyurethanes, polyethers, polyesters, polyacrylates, polyvinyl esters, ethylene-olefin copolymers, styrene-butadiene copolymers or polyolefins, described, inter alia, in EP 0 372 561, WO 00/37533 or U.S. Pat. No. 6,207,766. However, additionally widespread are also systems whose backbone consists entirely or at least partially of organosiloxanes, described inter alia in WO 96/34030.

In a particularly advantageous preparation process for alkoxysilane-terminated prepolymers, the starting materials are polyols, for example polyether polyols or polyester polyols, which are reacted in a first reaction step with an excess of a di- or polyisocyanate. Subsequently, the isocyanate-terminated prepolymers obtained are reacted with aminoalkyl-functional alkoxysilanes to give the desired alkoxysilane-terminated prepolymer. Alternatively, it is also possible to prepare alkoxysilane-terminated prepolymers by reacting a polyol or an OH-functional polyurethane, as preparable by the reaction of polyols with a deficiency of di- or polyisocyanates, with an isocyanatoalkyl-functional alkoxysilane. These preparation processes are described, for example, in EP 1 421 129 or WO 2005/000931. It is also possible to conceive of further preparation processes, for example the reaction, described in WO 02/034838, of amino-functional polyols with carbamatoalkylalkoxysilanes. Additionally known are also alkoxysilane-functional prepolymers with a poly(meth)acrylate backbone. These are typically formed by a copolymerization of (meth)acryloyloxyalkylalkoxysilanes with other (meth)acryloyl monomers and/or further unsaturated monomers, for example styrene.

In addition, alkoxysilane-functional polymers can also be prepared by subsequent grafting of unsaturated alkoxysilanes, for example of vinyl- or (meth)acryloylsilanes.

In addition to use as an adhesive and sealant, and as a coating composition and surface modifier, the use of alkoxysilane-functional prepolymers for production of silane-crosslinking rigid and flexible foams, especially of isocyanate-free sprayable assembly foams, is also known and is described, for example, in EP-A1-098 920 or EP-A1-1 363 960. These spray foams are typically applied from pressurized canisters and serve in particular for sealing of window joints, as a filling and reinforcing material for door frames or generally for filling and sealing of cavities in construction. In accordance with these applications, are notable for a very low foam density, i.e. a very large volume yield per foam can and hence a maximum productivity. The low foam densities are achieved by addition of a maximum amount of physical blowing agents (i.e. gases liquefied under pressure in the foam can, which drive the foam formation in the spraying operation).

WO 2008/058955 teaches a process for bonding surfaces, in which a foamable mixture which comprises prepolymers with exclusively terminal and isolated alkoxysilyl groups and a basic group in the molecule, for example an $NH_2$—, $NHR^3$— or $N(R^3)_2$-group, and blowing agents is foamed to give a foam on one of the surfaces to be bonded or between the surfaces to be bonded, or else the foam producible from the mixture, after the foaming, is applied to one of the surfaces to be bonded or between the surfaces to be bonded, and the foam is then flattened between the surfaces to be bonded.

The teaching of WO 2008/058955 also envisages enhancing the effect introduced by the trialkoxysilyl units already expressed in the copolymer structure by adding thereto further free silanes as additional components which can assume several functions. There is discussion of the role thereof as a water scavenger (improvement of the storage stability), as a crosslinker and/or reactive diluent (increase in the network density and hence improvement in the mechanical properties, for example the breaking strength, of the cured composition) and, not least preferably in the form of the alkoxylsilanes, the role thereof as adhesion promoters.

The pure function as curing catalysts or at least curing cocatalysts is even ascribed to the low molecular weight alkoxysilanes of WO 2008/058955, i.e. alkoxysilanes which have a basic group such as an $NH_2$—, $NHR^3$— or $N(R^3)_2$-group.

A disadvantage of the procedure described is the low functionalization density of the prepolymer terminated with silyl groups only in the α,ω positions. In view of the high molecular weight structure of the desired polyurethane polymer, the silyl modification appears to be modest, if not inadequate to effectively address the desired effect of good and permanent substrate adhesion. Therefore, the teaching of WO 2008/058955 is based on the option of adding free silanes to the PU matrix in order to cause the desired effects (adhesion promotion, drying, crosslinking and the like). This in no way ensures the controlled incorporation of silyl anchor groups at the positions in the polymer which require the positive effect thereof. Especially for the purposes of quality-assuring reproducibility, the process described shows deficiencies.

The teaching of WO 2007/085605 attempts to counter the deficiency explained, which arises from this uncertainty-afflicted formulability of the system components, by stating that the three-substance combination consisting of alkoxysilane-terminated polymers, free aminoalkylalkoxysilane and an alkoxysilane having free acrylato or methacrylato groups is required to ensure, after copolymerization of the components, an improvement in adhesion on various substrates. The application examples executed therein underline that the copolymerization of the alkoxysilyl-terminated polymers consisting of the binary substance combinations with aminosilanes, or of alkoxysilyl-terminated polymers with methacryloylsilane, worsens the profile of adhesion. Since both the aminosilane and the methacryloylsilane are not present in polymer-bound form in the prepolymer matrix, the localization thereof in the polymer in the course of the later copolymerization satisfies statistical laws to a greater or lesser degree. In order nevertheless to ensure a certain three-dimensional equal distribution actually within the prepolymer, there is a requirement for the preparation, preferred according to the teaching of WO 2007/085605, of the reactive polymer blends, by first preparing a mixture of the alkoxysilyl-terminated polymer and a filler, and then adding the methacryloylsilane, then the aminosilane, and finally inducing copolymerization.

The teaching of the application document which has been filed as DE 10 2008 043218, but was yet to be published at the priority date of the present application, seeks to address this need for a technically simple, reliable and especially reproducible process by pointing out that the technical restrictions and disadvantages detailed above can be overcome by using, as the copolymer component, novel polyether alcohols which bear alkoxysilyl groups and are obtainable by alkoxylation of epoxy-functional alkoxysilanes over double metal cyanide (DMC) catalysts, and are described in DE 10 2008 000360.3, which was yet to be published at the priority date of the present application, and which is hereby fully incorporated by reference into the subject matter of this disclosure.

The novel polyether structures claimed therein, referred to here as silyl polyethers 1 for short, which may have both alkoxysilane functions within the sequence of the oxyalkylene units of the polyether chain and novel alkoxysilane functions in the termini thereof, allow the anchor group density in the desired prepolymer to be adjusted as desired, i.e. matched to the particular application objective.

These polyether structures have a molar mass distribution of $M_w/M_n \geq 1.5$ and thus differ from other systems of narrow polydispersity based on DMC catalysis.

The reactive silyl polyethers 1 claimed in DE 10 2008 000360.3 are curable polymers due to their hydrolysis-sensitive alkoxysilyl groups which tend to crosslink. The crosslinking thereof to give solid thermoset and products is effected in a simple manner in the presence of water, and optionally with addition of acid or base as an accelerator, and the pot life can be controlled during the curing operation by increasing the temperature. Thus, the polymer structure of these crosslinkable polyethers, according to and type of the initiator and according to the type, amount and sequence of the epoxide monomers usable, can be varied in various ways, in order in this way to tailor important product properties for the application depending on the particular end use. For example, by a variation in the proportion of alkoxysilane units in the polymer chain, it is possible to influence the crosslinking density and hence the mechanical and physicochemical profile of properties of the cured polymers within wide limits. Surprisingly, even silyl polyethers 1 equipped with notable alkoxysilyl functionalization density here are low-viscosity liquids which are easy to handle, and so there are no restrictions whatsoever with regard to the dosage of this component even in the case that highly crosslinked bonds with good adhesion are desired. This observation differentiates the inventive teaching from the procedure detailed in WO 2008/058955, which emphasizes the introduction of free silane monomers as formulation constituents in the final formulations in order to ensure that the necessary crosslinking density is achieved with simultaneously low processing viscosity. The silyl polyethers 1 having alkoxysilyl groups, the structural variety of which is virtually unlimited, already give the person skilled in the art conversant in polymer chemistry, through the incorporation, for example, of ester, carbonate and aromatic structural elements, a degree of configuration freedom which addresses virtually any application requirements.

It is an object of the present invention to provide novel curable compositions with an adjustable profile of hardness and properties, comprising monomers containing silyl groups.

It has been found that, surprisingly, the hydroxyl compounds bearing alkoxysilyl groups preparable according to DE 10 2008 000360.3 can be combined in a compatible system, in an ideal and diverse manner, with conventional alkoxysilyl-functional prepolymers.

The preferably poly-alkoxysilyl-functional silyl polyethers 1 are outstandingly suitable as components in a wide variety of different kinds of curable compositions, for example in combination with alkoxysilyl-functional prepolymers, for example alkoxysilyl-terminated polyethers, polyesters, polyether esters, polyurethanes, or else in mixtures with polysiloxanes having alkoxysilyl groups. As a formulation component, due to their surprisingly low viscosity, they assume the function as a reactive diluent, in particular in combination with the typically high-viscosity and high molecular weight silyl-terminated polyurethanes and polyethers of the prior art. In this function, they can wholly or partly replace the monomeric reactive diluents which have been customary to date, such as tetraalkoxysilanes or alkyltrialkoxysilanes. The silyl polyethers 1 are preferably combined with further silane compounds, more preferably different from formula 1.

At the same time, they open up the possibility of remedying the lack of alkoxysilyl functionality of existing silyl-terminated prepolymers. For instance, the use of silyl polyethers 1 with a high level of alkoxysilyl functionality in systems containing conventional silyl polymers is an effective, reproducible and efficient method of increasing the crosslinking density and hence the mechanical properties and the adhesion on various substrates. According to the mixing ratio and selection of the system components, it is thus possible in a simple manner to control the processing and final properties of cured silyl polymer systems. An inventive combination of the silyl polyethers 1 with polysiloxanes bearing alkoxysilyl groups, for example the compounds described in WO 2007/061847, allows the properties typical of siloxanes to be combined with those of organic curable polymers.

The silyl polyethers 1 preparable by the route of DMC catalysis can be used in mixtures with all silyl-functional compounds which have at least one alkoxysilyl group bonded chemically to a polymer structure. Such silane-modified polymers are silane compounds of the type of the formula (2)

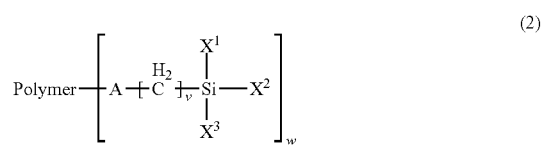

where

X¹, X² and X³ are each independently alkyl or alkoxy radicals having 1-8 carbon atoms, A is a radical containing a carboxyl, carbamate, amide, carbonate, ureido or sulfonate group, or an oxygen atom, w is an integer from 1 to 8 and v is an integer from 1 to 20, preferably 1 to 15 and especially 1 to 5.

The polymer radical is selected from a group consisting of alkyd resins, oil-modified alkyd resins, saturated or unsaturated polyesters, natural oils, epoxides, polyamides, polycarbonates, polyethylenes, polypropylenes, polybutylenes, polystyrenes, ethylene-propylene copolymers, (meth)acrylates, (meth)acrylamides and salts thereof, phenol resins, polyoxymethylene homo- and copolymers, polyurethanes, polysulfones, polysulfide rubbers, nitrocelluloses, vinyl butyrates, vinyl polymers, ethylcelluloses, cellulose acetates and/or butyrates, rayon, shellac, waxes, ethylene copolymers, organic rubbers, polysiloxanes, polyether siloxanes, silicone resins, polyethers, polyether esters and/or polyether carbonates.

The polymers of the formula (2) used preferentially in mixtures with the silyl polyethers 1 include what are called α-silane-terminated polymers, whose reactive alkoxysilyl groups are separated only by one methylene unit (v=1) from a nitrogen-containing polymer-bound A group. Such α-silane polymers bonded to a polymer structure via a urethane or urea unit contain, as substituents on the silicon, usually methoxy or ethoxy groups. The polymer structure may be either linear or branched and either organic or siliconic in nature. Particular preference is given to α-silanes attached terminally to the ends of polyethers. Of particular significance are polyalkylene oxides, especially polypropylene glycols (w=2), with α-silane functions at each of the two chain ends, as sold under the Geniosil® STP-E10 and Geniosil® STP-E30 names by Wacker. The preparation of such α-silane prepolymers is described, for example, in PCT EP 05/003706 and EP-A1-1967550. Particularly suitable examples for use in mixtures with the silyl polyethers (1) are dimethoxy(methyl)silylmethyl carbamate- and/or trimethoxysilylmethyl carbamate-terminated polyethers.

The literature provides sufficient disclosure of the stereoelectronically induced α-effect, which comes into effect in the case of the polyoxyalkylene compounds provided with terminal aminoalkylenealkoxysilyl substituents and promotes the intramolecular hydrolytic detachment of the silicon-bonded alkoxy groups. By production of blends consisting of reactive, fast-curing α-silanes and the slower-curing silyl polyethers 1 according to DE 10 2008 000360.3, flexible adjustment of the pot life is possible. The α-silane content in the mixture brings about rapid commencement of curing and shortening of the tack-free time; the silyl polyethers 1 with a higher level of alkoxysilyl functionality according to DE 10 2008 000360.3 enable better through-curing and the attainment of higher ultimate mechanical strength values and, in the case of surface modifications, better chemical anchoring on the particular substrate. The characteristic properties and advantages of the two types of silyl polymers can thus be combined in an ideal manner (cf. FIG. 2).

Further silane polymers of the formula (2) usable in curable compositions with silyl polyethers 1 are those in which the silane groups are bonded terminally via a propylene unit (v=3) to a polymer structure and in which A is a urethane group. Preference is given to polyalkylene oxides, especially polypropylene glycols (w=2), with silane functions at each of the two chain ends, as obtainable under the Geniosil® STP-E15 and Geniosil® STP-E35 names from Wacker. The preparation of such silane polymers is described, for example, in EP 1824904. Particularly suitable examples for use in mixtures with the silyl polyethers 1 are dimethoxy(methyl)silylpropyl carbamate- and/or trimethoxysilylpropyl carbamate-terminated polyethers.

Compounds of the formula (2) likewise suitable as mixture constituents are silane-terminated polyurethanes, the preparation of which from a polyol by reaction with a diisocyanate and then with an amino-functional alkoxysilane is described, for example, in U.S. Pat. No. 7,365,145, U.S. Pat. No. 3,627,722 or U.S. Pat. No. 3,632,557. The binding group A is a radical bearing urethane or urea groups. A typical representative of this class of silane polymers is, for example, Desmoseal® S XP 2636 from Bayer Material Science. Cured silane-terminated polyurethanes are very suitable as binders for elastic adhesives and sealants, and also coatings. However, a characteristic disadvantage is the high viscosity thereof, which limits processability, as likewise emphasized in U.S. Pat. No. 7,365,145. Therefore, diluents are added to polymers of this type according to the prior art. These may either be reactive diluents, which not only lower the viscosity but at the same time increase the crosslinking density, such as monomeric alkoxysilanes, or nonreactive diluents, which may additionally have plasticizing properties. Mixtures curable in accordance with the invention, composed of silane-terminated polyurethanes with preferably low-viscosity silyl polyethers 1 usually having a relatively high level of alkoxysilyl functionality, prepared by the process disclosed in DE 10 2008 000360.3, combine the product properties of the two components. Used instead of conventional diluents, they enable flexible adjustment, preferably increase, in the alkoxysilyl functionality and hence mechanical strength, and improved substrate adhesion with simultaneous lowering of the viscosity, which, for example, increases the scope for the use of fillers.

Further silyl polyethers 1 usable in the context of the invention in systems comprising the products according to DE 10 2008 000360.3 are the long-known urethane- and urea-free silyl-terminated polyethers of the formula (2) where A is oxygen, in which the terminal alkoxysilyl groups are thus attached directly to the polymer structure via an ether function. Such silyl polymers are described in U.S. Pat. No. 3,971,751. They preferably consist of a polyether base structure, where v in formula (2) preferably has the value of 3 and w preferably has the value of 2, and are available as MS Polymer® products from Kaneka. Such curable silyl polyethers are outstandingly suitable as elastic sealants and adhesives, but are capable only of forming a low network density due to the alkoxysilyl groups bonded only terminally to a long polymer structure of about 10 000 g/mol. The combination thereof with low-viscosity, preferably poly-alkoxysilyl-functional, silyl polyethers 1 gives access to more highly crosslinkable systems which combine the advantages of both classes of products bearing silyl groups in one: the achievement of relatively high hardnesses, for example in the cured film or in the cured adhesive bond, with simultaneously good elasticity and adhesion. The use of such mixtures is combined with an often desired shortening of the tack-free time, since the solid polymer can form more rapidly in the course of curing owing to the higher number of crosslinkable silyl groups. The sole use of high-silyl-functionality polyethers 1 tends to lead, in contrast, to relatively brittle products (cf. FIG. 1).

It is also possible to combine polysiloxanes bearing alkoxysilyl groups, as described, for example, in WO 2007/061847, with curable silyl polyethers according to DE 10 2008 000360.3.

The silyl polyethers 1 preparable by DMC catalysis can likewise be used in mixtures with conventional monomeric silanes of the formula (2a)

$$W_xSiV_{(4-x)} \qquad (2a)$$

where W represents identical or different nonhydrolyzable groups, V=identical or different hydrolyzable groups or hydroxyl groups and x=1, 2, 3 or 4.

In formula (2a), the hydrolyzable V groups may, for example, be H, halogen, alkoxy (preferably methoxy, ethoxy, i-propoxy, n-propoxy or butoxy), aryloxy (preferably phenoxy), acyloxy (preferably acetoxy or propionyloxy), acyl (preferably acetyl), amino, monoalkylamino or dialkylamino groups. The nonhydrolyzable W radical may, for example, be an alkyl, alkenyl, alkynyl, aryl, alkylaryl or aralkyl radical. The alkyl chain may have 0 to 50, preferably 0 to 22, carbon atoms and may also be interrupted by heteroatoms such as oxygen or nitrogen or sulfur, or else be a silicone radical. The aromatic radical may also be heteroaromatic. The W and V radicals may each optionally have one or more customary substituents, for example halogen or alkoxy.

Nonhydrolyzable W radicals according to the formula (2a) with functional groups may be selected from the range of the glycidyl or glycidyloxyalkylene radicals, for example β-glycidyloxyethyl, γ-glycidyloxypropyl, δ-glycidyloxypropyl, ε-glycidyloxypentyl, ω-glycidyloxyhexyl or 2-(3,4-epoxycyclohexyl)ethyl, methacryloyloxyalkylene and acryloyloxyalkylene radicals, for example methacryloyloxymethyl, acryloyloxymethyl, methacryloyloxyethyl, acryloyloxyethyl, methacryloyloxypropyl, acryloyloxypropyl, methacryloyloxybutyl or acryloyloxybutyl, and the 3-isocyanatopropyl radical.

Such organofunctional monomeric silanes are, for example, N-cyclohexylaminomethyltrimethoxysilane, N-cyclohexyl-3-aminopropyltriethoxysilane, 3-aminopropyltrimethoxysilane, vinyltrimethoxysilane, vinyltriethoxysilane, vinyldimethoxymethylsilane, 3-isocyanatopropyltrimethoxysilane, 3-glycidyloxypropyltrimethoxysilane, 3-glycidyloxypropyltriethoxysilane, 3-methacrylayloxypropyltrimethoxysilane, methyltrimethoxysilane, methyltriethoxysilane, dimethyldimethoxysilane, phenyltriethoxysilane and/or hexadecyltrimethoxysilane, alone or in mixtures with one another. An introduction into this topic is given by "Silylated Surfaces", edited by Donald E. Leyden and Ward T. Collins, Gorden and Breach Science Publishers, Inc., 1980, ISBN 0-677-13370-7.

It is generally left to the expert to select the components suitable for the desired profile of properties in order to obtain optimized copolymer systems. The inventive compositions therefore make available a tool box of different profiles of properties, from which an optimized composition can be selected according to the application.

Moreover, it has been found that, surprisingly, the structure types claimed in the application DE 10 2008 000360.3, for the purposes of improving properties, can be combined both in the prepolymeric blend and in the cured polymer also with crosslinkable compounds which do not bear silyl groups. For instance, mixtures of the silyl polyethers 1 with unsaturated compounds having double bonds, for example in the form of allyl, vinyl, acrylate or methacrylate groups, can be produced and cured by two mechanisms—hydrolytically via the alkoxysilyl groups and free-radically or with UV initiation via the double bonds. It is likewise possible to produce mixtures of the silyl polyethers 1 with epoxides and to cure them together in the presence of moisture and amines.

In addition to adjustable potlives, which are desired in particular adhesive or sealant applications, the compositions claimed here in accordance with the invention open up access to copolymer systems with distinctly improved properties compared to the individual components. For example, the polymers characterized by high moduli of elasticity but simultaneously having low compressive strengths, which derive from the curing of purely linear polyoxyalkylene compounds having α,ω-alkoxysilyl groups, experience a distinct gain in compressive strength as a result of the co-curing claimed here in accordance with the invention with silyl polyethers 1 bearing alkoxysilyl groups, which may also have hydrolytically curable alkoxysilyl substituents within the polyoxyalkylene chain.

Silyl polyethers 1 can likewise be used in curable compositions with polyethersiloxanes functionalized with alkoxysilyl groups, as described in DE 10 2008 044373.5, which was yet to be published at the priority date of the present application. These usable silane compounds are preferably those compounds of the formula 1 in which $R^1$=a silicon-containing radical or a siloxane radical which may be substituted by alkyl and/or aryl groups. Such silylated siloxane-polyether copolymers likewise preparable by the route of DMC-catalyzed alkoxylation of epoxy-functional alkoxysilanes are curable compounds which at the same time usually have surfactant action. The use thereof in systems comprising silyl polyethers 1 and possibly further silane compounds of the formula (2) or (2a) permits, for example, the wetting of the substrates to be coated or to be bonded and hence improvement in the adhesion properties. In the case of suitable selection of the polyether siloxanes bearing silyl groups, it is possible to use further effects, especially interfacial phenomena such as the spreading of the compositions to be cured in thin layers or the effect as deaerators, in order to remove air bubbles stirred in when the components of the curable mixtures are stirred together.

The inventive curable mixtures are suitable, for example, as base materials for the production of adhesives, for surface coating and surface modification, as reactive crosslinkers, as adhesion promoters and primers, and binders or sealants for various substrates such as metals, glass and glass fibers/glass fabric, wood, woodbase materials, natural fibers, and, for example, also cork and silicatic materials in general. For instance, the controlled incorporation of the alkoxysilyl moieties which are anchored via hydrolytic processes to brickwork, concrete, mortar, etc. is found to be exceptionally advantageous in the case of use of such modified systems in the construction sector, where the critical factor is the bonding and insulating sealing of, for example, frames of doors and windows in building shells. Novel plasticizer systems are also obtainable in the case of use of selected components.

Since the novel curable mixtures do not release any gaseous reaction products in the course of curing thereof, it is also possible to use them to coat surfaces in the form, for example, of a coating system or of a coating system constituent. For instance, WO 2008/074489 describes coating compositions with high scratch resistance and weathering resistance based on polyols and polyisocyanates with hydrolyzable silane groups.

As a result of the possibility of dispensing with free isocyanates, it is also possible to extend applications to those involving food contact. The inventive polymers may serve as binders, i.e. for bonding of identical or different substances to one another, in the production of woodbase materials, for example chipboard or MDF panels, or for the bonding of wood or cork particles (including wood shavings or wood fibers), and are thus also available as a replacement for amino resins or isocyanate adhesive compositions for floors, parquet and laminate applications. The redistribution of the reactive groups from the polyisocyanate modified with silane groups to the polyol with simultaneous provision of multiple hydrolyzable alkoxysilyl groups leads to novel adhesive and coating compositions with a variably adjustable profile of properties. The inventive polymers may also have thermoplastic properties and hence also serve for production of moldings in which temperature-dependent flow characteristics are necessary. The molding compositions can be used in processes such as injection molding, extrusion or hot pressing, for example. The inventive curable mixtures can also be used without catalysts, such that there is no need for further curing and crosslinking during the shaping operation. After the crosslinking, the polymers bearing silyl groups are converted to thermoset products.

As known to those skilled in the art, the crosslinking or curing of alkoxysilyl groups takes place in a two-stage chemical process, in which, in a first step in the presence of water, though air humidity may also suffice, the alkoxy groups bonded to the silicon are eliminated as corresponding alcohols and SiOH groups are formed. In the case of self-condensation, the latter then condense with one another to form Si—O—Si bridges and form polymeric materials. Alternatively, the SiOH-functional intermediates react with substrates having reactive groups, for example particularly efficiently with silicatic surfaces bearing OH functions, and lead to excellent chemical anchoring on the particular substrate. The curing rate can be influenced in various ways, by adding catalysts or temperature variation.

In this way, it is possible to obtain polymeric materials, optionally with foam-like structure, by bringing about the known processes of free or catalytic curing of prepolymer systems. By virtue of the variability and multitude of possible inventive silyl polymer mixtures, it is possible to determine the preferential form to be selected according to the application.

Preferably, the silyl polyethers 1 present in the curable mixtures have an average of more than one alkoxysilyl function per hydroxyl group. Additionally preferred are mixtures which contain, in addition to at least one compound of the formula 1, those which comprise further silane compounds other than those of formula 1.

The silyl polyethers 1 usable in mixtures in accordance with the invention, especially the alkoxysilyl-modified polyetherols of the formula (1), can be obtained, for example, by the reaction between epoxides modified with silyl groups and a starter alcohol from a wide variety of different origins.

The preparation and the usable epoxide structure types are described in detail in DE 10 2008 000360.3, which was yet to be published at the priority date of the present application. The content of the description and of the claims of DE 2008 000360.3 is hereby fully incorporated into this disclosure by reference.

The compounds thus prepared give the synthetic freedom to select between polyoxyalkylene compounds having alkoxysilyl groups, which contain alkoxysilyl functions terminally, or else in isolated form, in blocklike cumulation, or else in random distribution in the polyoxyalkylene chain.

The silyl compounds thus prepared, especially the silyl polyethers 1 which have been modified with alkoxysilyl groups and are of the formula (1), are notable in that they can be prepared in a controlled and reproducible manner with regard to structure and molar mass. The sequence of the monomer units can be configured variably within wide limits. Epoxide monomers can be incorporated into the polymer chain as desired, in blockwise succession or randomly. The fragments inserted into the polymer chain which forms by the reaction with ring opening of the reaction components are freely permutable with one another in terms of sequence, with the restriction that cyclic anhydrides and carbon dioxide are present randomly inserted into the polyether structure, i.e. not in homogeneous blocks.

When the prepolymers used are those of the formula (1) and fewer than 3 alkoxy groups are bonded to the silicon atom of the polyether of the formula (1), highly functionalized networks are formed, in which polyether chains which are each started by $R^1$ and which contain the fragments whose sequence is freely permutable, and which have been inserted into the polymer chain which forms by the reaction with ring opening of the reaction components, are joined to one another via —$CH_2$—O—$(CH_2)_c$—Si—$(CH_2)_c$—O—$CH_2$— bridges. The result is thus highly complex, highly functionalized structures. Here too, it is possible to adjust the functionalities in a controlled manner to a desired field of use. The degree of crosslinking and the complexity of the polymer structures obtained rise with increasing epoxy functionality of the silyl monomers. Very particular preference is given to 3-glycidyloxyalkyltrialkoxysilanes as monomers.

The fragments which have been inserted into the polymer chain which forms by the reaction with ring opening, in blockwise or random distribution in the context of the above definitions, may occur not only in the chain of a polyether structural unit, but also in random distribution over the multitude of polyether structural units formed, which are bonded to one another via —$CH_2$—O—$(CH_2)_c$—Si—$(CH_2)_c$—O—$CH_2$— bridges. The diversity of the structural variations of the process products thus does not permit absolutely unambiguous description in terms of formula.

The silyl polyethers 1 used are preferably polyether structures of the formula (1)—see also FIG. 1. These consist of linear chains which are substituted by alkoxysilyl groups and are highly functionalized in a controlled manner by the selection of the fragments d to j, in accordance with the fragments inserted into the polymer chain by the reaction with ring opening of the reaction components, and hence can be tailored for various fields of application.

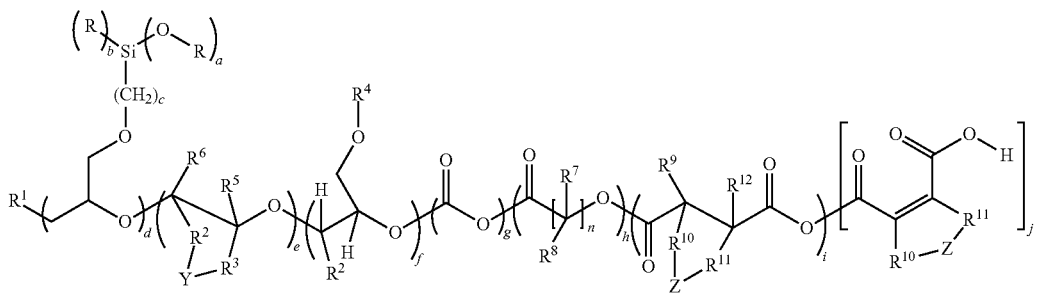

Silyl polyether 1 of the formula (1) (see also FIG. 1) where
a is an integer from 1 to 3, preferably 3,
b is an integer from 0 to 2, preferably 0 to 1, more preferably 0, and the sum of a and b is equal to 3,
c is an integer from 0 to 22, preferably from 0 to 12, more preferably from 0 to 8, even more preferably from 0 to 4, and is especially 1 or 3,
d is an integer from 1 to 1000, preferably 1 to 100, more preferably 4 to 20 and even more preferably 5 to 10 and especially greater than 4 or 10,
e is an integer from 0 to 10 000, preferably 1 to 2000, more preferably 1 to 1000 and especially 1 to 500,
f is an integer from 0 to 1000, preferably 0 to 100, more preferably 0 to 50 and especially 0 to 30,
g is an integer from 0 to 1000, preferably 0 to 200, more preferably 0 to 100 and especially 0 to 70,
h, i and j are each integers from 0 to 500, preferably 0 to 300, more preferably 0 to 200 and especially 0 to 100,
n is an integer from 2 to 8,
and with the proviso that the fragments with the indices d to j are freely permutable with one another, i.e. are exchangeable for one another in the sequence within the polyether chain, and R represents one or more identical or different radicals selected from linear or branched, saturated or mono- or polyunsaturated alkyl radicals having 1 to 20, especially 1 to 6, carbon atoms or haloalkyl groups having 1 to 20 carbon atoms. Preferably, R represents methyl, ethyl, propyl, isopropyl, n-butyl and sec-butyl groups; and $R^1$ is a saturated or unsaturated, optionally branched radical preferably attached via an oxygen atom, or is a polyether radical of the alkoxy, arylalkoxy or alkylarylalkoxy group type in which the carbon chain may be interrupted by oxygen atoms, or $R^1$ is an optionally singly or multiply fused aromatic aryloxy group, where the $R^1$ radical in the silyl polyether 1 preferably does not have a silicon atom, and $R^2$ and $R^3$, and $R^5$ and $R^6$, are the same, or else are each independently, H or a saturated or optionally mono- or polyunsaturated, also further-substituted, optionally mono- or polyvalent hydrocarbon radical, it being the case the $R^5$ and $R^6$ radicals are each a monovalent hydrocarbon radical.

The hydrocarbon radical might be bridged cycloaliphatically via the Y fragment; Y may be absent, or else may be a methylene bridge having 1 or 2 methylene units; if Y is absent, $R^2$ and $R^3$ are each independently a linear or branched radical having 1 to 20, preferably 1 to 10, carbon atoms, more preferably a methyl, ethyl, propyl or butyl, vinyl, allyl or phenyl radical. Preferably, at least one of the two $R^2$ and $R^3$ radicals is hydrogen. $R^2$-$R^3$ may be a —$CH_2CH_2CH_2CH_2$— group, and Y may thus be a —$(CH_2CH_2$—)— group. The hydrocarbon radicals $R^2$ and $R^3$ may in turn have further substitution and bear functional groups such as halogens, hydroxyl groups or glycidyloxypropyl groups.

$R^4$ is a linear or branched alkyl radical of 1 to 24 carbon atoms or an aromatic or cycloaliphatic radical which may optionally in turn bear alkyl groups;

$R^7$ and $R^8$ are each independently hydrogen, alkyl, alkoxy, aryl or aralkyl groups which are copolymerized with ring-opening polymerization to give crosslinkable polyether esters containing alkoxysilane groups.

$R^9$, $R^{10}$, $R^{11}$ and $R^{12}$ are each independently hydrogen, alkyl, alkenyl, alkoxy, aryl or aralkyl groups. The hydrocarbon radical may be bridged cycloaliphatically or aromatically via the Z fragment, and Z may be either a divalent alkylene or alkenylene radical.

As $^{29}$Si NMR and GPC analyses show, the process-related presence of chain-terminal OH groups results in the option of transesterification reactions on the silicon atom, both during the DMC-catalyzed preparation and, for example, in a downstream process step. In a formal sense, this involves exchanging the alkyl radical R bonded to the silicon via an oxygen atom for a long-chain modified alkoxysilyl polymer radical. Bimodal and also multimodal GPC curves show that the alkoxylation products contain not only the non-transesterified species as reproduced in formula (1) but also those with twice, in some cases three times or even four times, the molar mass. Formula (1) therefore represents the complex chemical reality only in simplified form.

Thus, the silyl polyethers 1 are compositions which also comprise compounds in which the sum of the indices (a) plus (b) in formula (1) on statistical average is less than 3, since some of the OR groups can be replaced by silyl polyether groups. The compositions thus contain species which are formed at the silicon atom with elimination of R—OH and condensation reaction with the reactive OH group of a further molecule of the formula (1). This reaction can proceed several times until, for example, all RO groups on the silicon have been exchanged for further molecules of the formula (1). The presence of more than one signal in typical $^{29}$Si NMR spectra of these compounds supports the presence of silyl groups with different substitution patterns.

The values and preferred ranges reported for the indices (a) to (j) should thus also be understood merely as average values over the different species which cannot be considered individually. The diversity of chemical structures and molar masses is also reflected in the broad molar mass distributions of $M_w/M_n$ of usually ≥1.5, which are typical of silyl polyethers 1 and are entirely unusual for conventional DMC-based polyethers.

The starters or starter compounds used for the alkoxylation reaction may be all compounds of the formula (3)

$$R^1\text{—}H \qquad (3)$$

(the H belongs to the OH group of a compound having at least one hydroxyl group, for example of an alcohol or of a phenolic compound), alone or in mixtures with one another, which have at least one reactive hydroxyl group according to formula (3). $R^1$ is a saturated or unsaturated, optionally branched radical which has at least one oxygen atom of a hydroxyl group, or is a polyether radical of the alkoxy, arylalkoxy or alkylarylalkoxy group type in which the carbon chain may be interrupted by oxygen atoms, or $R^1$ is an optionally singly or multiply fused aromatic aryloxy group. The chain length of the polyether radicals which have alkoxy, arylalkoxy or alkylarylalkoxy groups and are usable as starter compounds is as desired. The polyether, alkoxy, arylalkoxy or alkylarylalkoxy group preferably contains 1 to 1500 carbon atoms, more preferably 2 to 300 carbon atoms, especially 2 to 100 carbon atoms.

Starter compounds are understood to mean substances which form the start of the polyether molecule (1) to be prepared, which is obtained by the addition of epoxy-functional monomers. The starter compound used in the process is preferably selected from the group of the alcohols, polyetherols and phenols. The starter compound used is preferably a mono- or polyhydric polyether alcohol or alcohol $R^1$—H (the H forms part of the OH group of the alcohol or phenol).

The OH-functional starter compounds $R^1$—H (3) used are preferably compounds with molar masses of 18 to 10 000 g/mol, especially 50 to 2000 g/mol, and having 1 to 8, preferably having 1 to 4, hydroxyl groups.

Examples of compounds of the formula (3) include allyl alcohol, butanol, octanol, dodecanol, stearyl alcohol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol, cellulose sugar, lignin, or else further compounds which bear hydroxyl groups and are based on natural substances.

Advantageously, the starter compounds used are low molecular weight polyetherols having 1 to 8 hydroxyl groups and molar masses of 50 to 2000 g/mol, which have themselves been prepared beforehand by DMC-catalyzed alkoxylation.

In addition to compounds having aliphatic and cycloaliphatic OH groups, suitable compounds are any having 1 to 20 phenolic OH functions. These include, for example, phenol, alkyl- and arylphenols, bisphenol A and novolacs.

The different monomer units both of the fragments with the indices d to j and of any polyoxyalkylene chain present in the substituent $R^1$ may have a blockwise structure with respect to one another, or else be subject to a random distribution.

The indices reproduced in the formulae shown here and the value ranges of the indices specified are therefore the mean values of the possible statistical distribution of the structures actually present and/or mixtures thereof. This is also true of structural formulae reproduced exactly per se as such, for example for formula (1).

According to the epoxy-functional alkoxysilane used and any further monomers used, and also any carbon dioxide, it is possible to prepare modified polyether alcohols (1) bearing alkoxysilyl groups, and mixtures thereof with any composition. The alkoxysilane unit in the compound of the formula (1) is preferably a trialkoxysilane unit.

The inventive curable mixtures comprising preferably at least one component of the formula (2) or (2a) and at least one component of the formula (1) can be used, for example, for coating and modification of flat, particulate, fibrous surfaces and fabrics, and as sealants. The coating may, for example, be an adhesive coating, especially a foamed adhesive coating. The curable mixture can also be used in the form of an emulsion or solution, preferably as an aqueous emulsion.

If these inventive compositions are intended to be foamable, they comprise one or more blowing agents, optionally formed chemically.

The surfaces to be coated can be coated by known methods, such as spraying, painting, dipping, etc. The surfaces to be bonded are preferably pressed onto one another during the process. The optionally foamable mixture is applied to produce the bond preferably from a pressurized canister, and the foam is formed by the blowing agent present in the mixture, which may also be released by chemical reaction. The production and use of adhesive foams is described in detail in the document DE 10 2008 043218, which was yet to be published at the priority date of the present application.

Thus, the invention further provides a process for bonding surfaces, in which a foamable composition is provided, which is foamed between the surfaces to be bonded to form a foam, or else the foam producible from the mixture is applied after the foaming to one of the surfaces to be bonded or between the surfaces to be bonded, and the foam is then flattened between the surfaces to be bonded.

Suitable blowing agents are gases which are already condensable at relatively low pressures, and are also used for production of sprayable assembly foams. Suitable blowing agents are, for example, hydrocarbons having in each case 1 to 5, especially 3 to 5, carbon atoms, especially propane-butane mixtures or isobutane, hydrofluorocarbons having 1-5 carbon atoms, e.g. 1,1,1,2-tetrafluoroethane or 1,1-difluoroethane, or dimethyl ether, and corresponding mixtures. The blowing agent content is preferably <10% by weight, more preferably <7 or <5% by weight, based on the overall mixture.

The content of the blowing agents based on the overall mixture is preferably not more than 10% by weight, more preferably not more than 7% by weight.

The foam can also be formed without addition of a blowing agent on a purely chemical basis, but this is preferably in the case of warm or hot curing. In this case, heating of the adhesive mixture forms a low-volatility blowing agent, which comprises, for example, alcohols such as methanol, ethanol, which have formed from the hydrolysis of the alkoxysilyl group. It is also possible for water or an inert solvent to serve as a blowing agent at elevated temperature.

If coating of a substrate is desired, it is possible to simply dispense with the blowing agent, and optionally to establish the material properties required for coatings in a controlled manner by addition of solvents or further additives and assistants. The present invention therefore also provides a process for coating or for modifying surfaces, wherein a composition comprising silyl polyethers 1 with at least one further silane compound of the formula (2) or (2a) is applied to the surface to be treated and cured.

The catalysts used for the crosslinking or polymerization of the inventive prepolymer mixtures may be the known polyurethanization, allophanatization or biuretization catalysts, which are known per se to those skilled in the art. These include compounds such as the zinc salts zinc octoate, zinc acetylacetonate and zinc 2-ethylcaproate, or tetraalkylammonium compounds such as N,N,N-trimethyl-N-2-hydroxypropylammonium hydroxide, N,N,N-tri-methyl-N-2-hydroxypropylammonium 2-ethylhexanoate or choline 2-ethylhexanoate, for example used are. Preference is given to the use of zinc octoate(zinc 2-ethylhexanoate) and the tetraalkylammonium compounds, particular preference to that of zinc octoate. It is additionally possible to use, as catalysts, the customarily used organic tin compounds, for example dibutyltin dilaurate, dioctyltin dilaurate, dibutyltin diacetylacetonate, dibutyltin diacetate or dibutyltin dioctoate, etc. In addition, it is also possible to use bismuth catalysts, for example the Borchi catalyst, titanates, e.g. titanium(IV) isopropoxide, iron(III) compounds, e.g. iron(III) acetylacetonate, or else amines, e.g. triethylamine, tributylamine, 1,4-diazabicyclo[2.2.2]octane, 1,8-diazabicyclo[5.4.0]undec-7-ene, 1,5-diazabicyclo[4.3.0]non-5-ene, N,N-bis-(N,N-dimethyl-2-aminoethyl)methylamine, N,N-dimethylcyclohexylamine, N,N-dimethylphenylamine, N-ethylmorpholine etc. Also suitable as catalysts are organic or inorganic Brønsted acids such as acetic acid, trifluoroacetic acid, methanesulfonic acid, toluenesulfonic acid or benzoyl chloride, hydrochloric acid, phosphoric acid, the mono- and/or diesters thereof, for example butyl phosphate, (iso)propyl phosphate, dibutyl phosphate, etc. It will be appreciated that it is also possible to use combinations of several catalysts.

The inventive curable compositions may also comprise what are called photolatent bases as catalysts, as described in WO 2005/100482. Photolatent bases are preferably understood to mean organic bases having one or more basic nitrogen atoms, which are present at first in a blocked form and only after irradiation with UV light, visible light or IR radiation release the basic form as a result of cleavage of the molecule. The content of the description and of the claims of WO 2005/100482 is hereby incorporated into this disclosure by reference.

The catalyst or the photolatent base is used in amounts of 0.001 to 5.0% by weight, preferably 0.01 to 1.0% by weight and more preferably 0.05 to 0.5% by weight, based on the solids content of the process product. The catalyst or the photolatent base can also be added in one portion or else in several portions or else continuously. Preference is given to addition of the entire amount in one portion.

As further components, the compositions may comprise fillers, solvents, foam stabilizers and catalysts to accelerate the curing of the foam. Fillers lead to an improvement in the breaking strength, and also in the breaking strain. Common fillers are, for example, calcium carbonate, fumed silica and carbon black. The different fillers are often also used in combination. Suitable fillers are all materials as have been described many times in the prior art. The fillers are preferably used in a concentration of 0 to 90% by weight, based on the finished mixture, particular preference being given to concentrations of 5 to 70% by weight.

The inventive compositions may additionally also comprise further organic substances, preferably liquids and solvents. The solvents used are preferably compounds which have a dipole moment. Particularly preferred solvents possess a heteroatom with free electron pairs which can enter into hydrogen bonds. Preferred examples of such solvents are ethers, for example t-butyl methyl ether, esters, for example ethyl acetate or butyl acetate, and alcohols, for example methanol, ethanol and the different regioisomers of propanol and of butanol, or else glycol types selected for the specific application.

In addition, it is also possible to add to the compositions functional substances known per se, such as rheological additives, water scavengers, thioxotropic agents, flame retardants, defoamers, deaerators, film-forming polymers, antimicrobial and preservative substances, antioxidants, dyes, colorants and pigments, antifreezes, fungicides, adhesion promoters and/or reactive diluents, and plasticizers and complexing agents, spraying aids, wetting agents, vitamins, growth substances, hormones, fragrances, light stabilizers, free-radical scavengers, UV absorbers and further stabilizers.

For the inventive compositions, there exist numerous different applications in the field of adhesives, sealants, binders and joint sealants. They are suitable for numerous different substrates, for example mineral substrates, metals, plastics, glass, ceramic, wood, woodbase materials, natural fibers or else cork, etc. In principle, the compositions or the foams produced therefrom are suitable for bonding of any articles. In particular, however, they are highly suitable when the surfaces to be bonded are uneven, or else small fibers or particles, and also, for example, cork, are to be bonded to one another to form a composite material.

This is the case, for example, for bonding of fracture sites which no longer exactly fit one another as a result of splintering or material bending, or else for bonding of base boards, crown moldings or other finishes on an uneven wall surface. The foams here have the advantage of also being able to efficiently fill cavities.

The invention thus also further provides composite materials obtained from the curable mixtures, for example wood composite materials such as MDF panels (medium-density fiberboard panels), chipboard, cork articles, laminated articles.

A further inventive use of the compounds bearing alkoxysilyl groups is that of aqueous emulsions. Useful emulsifiers for such emulsions include, in principle, all anionic, nonionic, cationic and amphoteric emulsifiers, and also emulsifier mixtures. Preferred examples of such emulsifiers are alcohol ethoxylates, fatty acid ethoxylates, ethoxylated esters and (ethoxylated) sorbitan esters.

The inventive compositions and the use thereof are described by way of example hereinafter, without any intention that the invention be restricted to these exemplary embodiments. When ranges, general formulae or compound classes are specified hereinafter, these shall include not only the corresponding ranges or groups of compounds mentioned explicitly, but also all sub-ranges and sub-groups of compounds which can be obtained by selection of individual values (ranges) or compounds. When documents are cited in the context of the present description, the contents thereof are fully incorporated into the disclosure content of the present invention.

Further configurations of the invention are evident from the claims, the disclosure content of which in full forms part of this description.

The examples adduced hereinafter describe the present invention by way of example, without any intention that the invention, the range of application of which is evident from the entire description and the claims, be restricted to the embodiments specified in the examples.

Experimental Section:

In the examples which follow, the following polyether SP-1 containing alkoxysilyl groups was used, which is by the in the document DE 10 2008 000360.3, which was yet to be published at the priority date of the present application, by the process principle of DMC-catalyzed alkoxylation of 3-glycidyloxypropyltriethoxysilane (GLYEO):

Silyl Polyether SP-1:

Low molecular weight, octanol-started, almost colorless and low-viscosity, substantially randomly formed polyether of mean molar mass approx. 3000 g/mol with seven-fold trialkoxysilane functionality.

Chemical structure according to monomer dosage:

1-octanol+8 mol of PO+(7 mol of GLYEO/10 mol of PO) Epoxide oxygen content <0.05%, $M_w$ by GPC 2760 g/mol, viscosity (25.0° C.): 0.15 Pa·s MS Polymer® S303H From Kaneka, a chain-terminally —Si(CH$_3$) (OCH$_3$)$_2$-functionalized conventional alkoxysilyl-terminated polypropylene glycol having a mean molar mass of approx. 12 000 g/mol, viscosity (25.0° C.) 12.0 Pa·s Geniosil® STP-E10

From Wacker, a chain-terminally

—Si(CH$_3$) (OCH$_3$)$_2$-functionalized alkoxysilylmethyl carbamate-terminated polypropylene glycol with a mean molar mass of approx. 11 500 g/mol.

The following homogeneous compositions composed of the above individual components were produced by mixing:

Blend 1: 50% by wt. of SP-1/50% by wt. of MS Polymer® S303H

Blend 2: 10% by wt. of SP-1/90% by wt. of MS Polymer® S303H

Blend 3: 90% by weight of SP-1/10% by weight of Geniosil® STP-E10

The mechanical properties and curing characteristics of the individual components and of selected curable inventive compositions were studied at 25° C. by means of oscillation rheology measurements. The magnitudes of the storage modulus G', as a measure of the elastic component, and of the loss modulus G", as a measure of the viscous loss component, were measured continually during the curing, beginning with the catalyst dosage. Catalysis was effected with 2% of a 5% aqueous p-toluenesulfonic acid solution. The deflection angle was 1 degree, the frequency 1 Hz. The curve profiles of G' and G" give information about the rise in the mechanical strength in the course of curing and allow, inter alia, statements about the reactivity and processing time.

Figure 2:
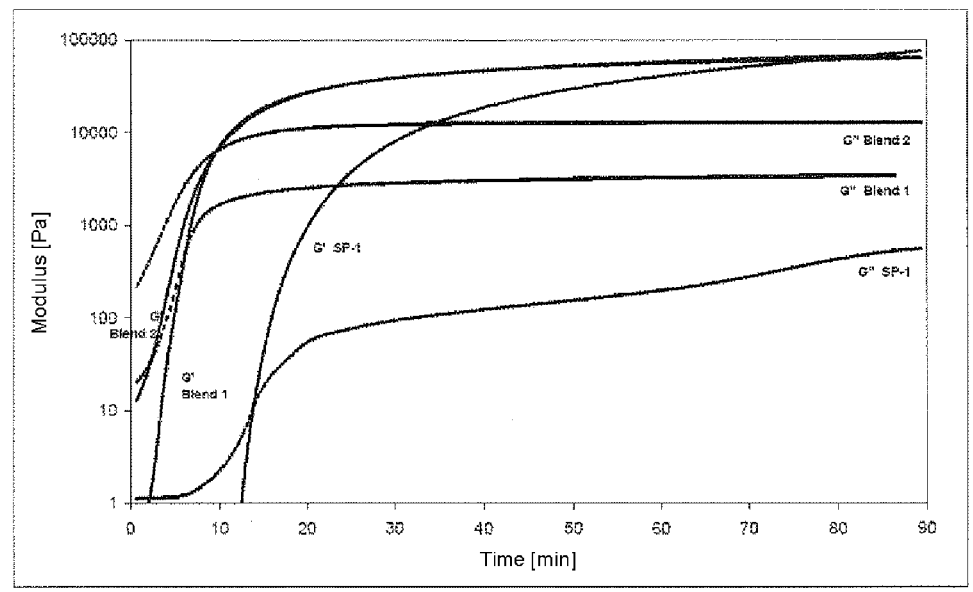

FIG. 2 shows the oscillation rheology studies of SP-1, blend 1 and blend 2 in comparison.

The mechanical and processing properties can be adjusted flexibly to the particular application requirements by suitable selection of the composition of the curable mixture. With increasing proportion of silyl polyether SP-1, the initial viscosity of the curable composition falls (reactive diluent effect of SP-1) and the system remains processable for longer, while higher hardnesses are at the same time achieved in the final material (high G' with low G").

FIG. 3 shows the oscillation rheology studies of SP-1 and blend 3 in comparison.

By means of a combination of 90% silyl polyether SP-1 with 10% of the highly reactive Geniosil® STP-E10 silane prepolymer bearing α-silane groups to give an inventive curable composition, it is possible in an ideal manner to combine the characteristic properties of the two individual components which are so different.

The starting system advantageously has low viscosity, the STP-E10 component accelerates the initial curing (short tack-free time) and the end product attains, after the crosslinking, the desired high mechanical strength as with straight SP-1.

The invention claimed is:

1. A curable composition comprising:
a hydroxyl compound which bears silyl groups; and
at least one further silane compound;
wherein the hydroxyl compound is of the formula 1:

Formula 1

$$\left(R\right)_b Si\left(O-R\right)_a$$
$(CH_2)_c$
$R^1\left[O\left(\begin{array}{c}R^6\\|\\-\\|\\R^2\end{array}\right)_d\left(\begin{array}{c}R^5\\|\\-\\|\\Y-R^3\end{array}\right)_e\left(\begin{array}{c}R^4\\|\\O\\H\\|\\-\\|\\H\\R^2\end{array}\right)_f\left(\begin{array}{c}O\\||\\-C-O\end{array}\right)_g\right.$ $\left.\left(\begin{array}{c}R^7\\|\\-O\\|\\R^8\end{array}\right)_n\left(\begin{array}{c}R^9\\|\\-\\|\\O=\\|\\R^{10}\\|\\Z\end{array}\right)_h\left(\begin{array}{c}R^{12}\\|\\-\\|\\R^{11}\end{array}\right)_i\left(\begin{array}{c}O\\||\\-C\\||\\O\\R^{10}-Z\end{array}\right)_j\begin{array}{c}O\\||\\C-O-H\\||\\R^{11}\end{array}\right]$ where:
a is an integer from 1 to 3;
b is an integer from 0 to 2;
the sum of a and b is equal to 3;
where:
c is an integer from 0 to 22;
d is an integer from 1 to 1,000;
e is an integer from 0 to 10,000;
f is an integer from 0 to 1,000;
g is an integer from 0 to 1,000;
h, i, and j are each integers from 0 to 500; and
n is an integer from 2 to 8;
with the proviso that the fragments with the indices d to j are freely permutable with one another; and
where:
R represents one or more identical or different, linear or branched, saturated or monounsaturated or polyunsaturated, alkyl or haloalkyl radicals having 1 to 20 carbon atoms;
$R^1$ is:
  a saturated or unsaturated, optionally branched radical attached via an oxygen atom; or
  a polyether radical of the alkoxy, arylalkoxy or alkylarylalkoxy group type, in which the carbon chain is optionally interrupted by oxygen atoms; or
  a polyetheralkoxy radical; or
  an optionally singly or multiply fused aromatic aryloxy group;
$R^2$ and $R^3$ are each independently:
  H; or
  a saturated or monounsaturated or polyunsaturated, optionally-substituted, monovalent or polyvalent hydrocarbon radical, it being the case that, when the $R^2$ and $R^3$ radicals are each a polyvalent hydrocarbon radical, the $R^2$ and $R^3$ radicals are cycloaliphatically bridged via the Y fragment, where:
    Y is absent, or is a methylene bridge having 1 or 2 methylene units;
    wherein, if Y is absent, $R^2$ and $R^3$ are each independently a linear or branched radical having 1 to 20 carbon atoms;

R⁴ is:
   a linear or branched alkyl radical of 1 to 24 carbon atoms; or
   an aromatic or cycloaliphatic radical which optionally bears at least one alkyl group;
R⁵ and R⁶ are each independently:
   H; or
   a saturated or monounsaturated or polyunsaturated, optionally-substituted, hydrocarbon radical; or
   a linear or branched radical having 1 to 20 carbon atoms;
R⁷ and R⁸ are each independently
   hydrogen; or
   an alkyl, alkoxy, aryl, or aralkyl group which is copolymerized with ring-opening polymerization to give a crosslinkable polyether ester containing alkoxysilane groups;
R⁹ and R¹⁰ are each independently
   hydrogen; or
   an alkyl, alkenyl, alkoxy, aryl, or aralkyl group; and
R¹¹ and R¹² are each independently;
   hydrogen; or
   an alkyl, alkenyl, alkoxy, aryl, or aralkyl group;
   where the hydrocarbon radical R¹¹ and R¹² radicals are optionally bridged cycloaliphatically or aromatically via the Z fragment; and
   where, if present, Z is a divalent alkylene or alkenylene radical.

2. The composition as claimed in claim 1;
wherein the further silane compound used is an alkoxysilyl-functional prepolymer, an alkoxysilyl-terminated polyether, an alkoxysilyl-terminated polyester, an alkoxysilyl-terminated polyether ester, an alkoxysilyl-terminated polyurethane, a polysiloxane or polyether siloxane having alkoxysilyl groups, or mixtures thereof.

3. The composition as claimed in claim 1;
wherein R¹ is a silicon-containing radical or a siloxane radical which is optionally substituted by alkyl and/or aryl groups.

4. The composition as claimed in claim 1;
wherein the further silane compound is a silane-modified polymer of the formula (2):

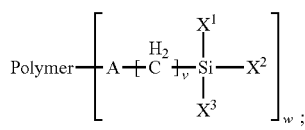 (2)

where:
   X¹, X², and X³ are each independently alkyl or alkoxy radicals having 1-8 carbon atoms;
   A is:
      a radical containing a carboxyl, carbamate, amide, carbonate, ureido, or sulfonate group; or
      an oxygen atom;
   w is an integer from 1 to 8;
   v is an integer from 1 to 20; and
   polymer is a polymer radical selected from a group consisting of alkyd resins, oil-modified alkyd resins, saturated polyesters, unsaturated polyesters, natural oils, epoxides, polyamides, polycarbonates, polyethylenes, polypropylenes, polybutylenes, polystyrenes, ethylene-propylene copolymers, (meth)acrylates, (meth)acrylamides and salts thereof, phenol resins, polyoxymethylene homopolymers, polyoxymethylene copolymers, polyurethanes, polysulfones, polysulfide rubbers, nitrocelluloses, vinyl butyrates, vinyl polymers, ethylcelluloses, cellulose acetates, cellulose butyrates, rayon, shellac, waxes, ethylene copolymers, organic rubbers, polysiloxanes, polyether siloxanes, silicone resins, polyethers, polyether esters, and polyether carbonates.

5. The composition as claimed in claim 4;
wherein v is 1, so that the alkoxysilyl-functional prepolymers of the formula (2) are α-silane-terminated polymers whose reactive alkoxysilyl groups are separated only by one methylene unit (v=1) from a nitrogen-containing polymer-bound A group.

6. The composition as claimed in claim 1;
wherein the hydroxyl compound of the formula 1 is mixed with dimethoxy(methyl)silylmethyl carbamate-terminated polyethers and/or trimethoxysilylmethyl carbamate-terminated polyethers.

7. The composition as claimed in claim 4;
wherein:
   v=3; and
   A is a urethane group or is a radical bearing urea groups.

8. The composition as claimed in claim 7;
wherein the silane polymer of the formula (2) is dimethoxy(methyl)silylpropyl carbamate- and/or trimethoxysilylpropyl carbamate-terminated polyether.

9. The composition as claimed in claim 4;
wherein the silane polymer of the formula (2) is a urethane-free and urea-free silyl-terminated polyether; and
where wherein A is oxygen.

10. The composition as claimed in claim 1,
wherein the further silane compound is a monomeric silane of the formula (2a):

 (2a);

where:
   W represents identical or different nonhydrolyzable groups, which are optionally substituted by one or more substituents and which are selected from the group consisting of:
      alkyl, alkenyl, alkynyl, aryl, alkylaryl, and aralkyl radicals, where the alkyl chain optionally has 0 to 50 carbon atoms and optionally is interrupted by at least one heteroatom;
   V represents identical or different hydrolyzable groups or hydroxyl groups, which are optionally substituted by one or more substituents, and which are selected from the group consisting of:
      hydrogen and halogen; and
      alkoxy, aryloxy, acyloxy, acyl, amino, monoalkylamino, and dialkylamino groups; and
   x is 1, 2, 3, or 4.

11. The composition as claimed in claim 10;
wherein the nonhydrolyzable W radical, in at least one case, is a selected from the group consisting of glycidyl, glycidyloxyalkylene, β-glycidyloxyethyl, γ-glycidyloxypropyl, δ-glycidyloxypropyl, ε-glycidyloxypentyl, ω-glycidyloxyhexyl, 2-(3,4-epoxycyclohexyl)ethyl, methacryloyloxyalkylene, acryloyloxyalkylene, methacryloyloxymethyl, acryloyloxymethyl, methacryloyloxyethyl, acryloyloxyethyl, methacryloyloxypropyl, acryloyloxypropyl, methacryloyloxybutyl, acryloyloxybutyl, and 3-isocyanatopropyl radicals.

12. The composition as claimed in claim 10,
the monomeric silane of the formula (2a) is at least one compound selected from the group consisting of N-cyclohexylaminomethyltrimethoxysilane, N-cyclohexyl-3-aminopropyltriethoxysilane, 3-aminopropyltrimethaxysilane, vinyltrimethoxysilane, vinyltriethoxysilane, vinyldimethoxymethylsilane, 3-isocyanato-propyltrimethoxysilane, 3-glycidyloxypropyltrimethoxysilane, 3-glycidyloxypropyltriethoxysilane, 3-methacryloyloxypropyltrimethoxysilane, methyl-trimethoxysilane, methyltriethoxysilane, dimethyldimethoxysilane, phenyltriethoxysilane, and hexadecyltrimethoxysilane, alone or mixed.

13. The composition as claimed in claim 1, further comprising
at least one additives selected from the group consisting of diluents, reactive diluents, solvents, organic fillers, inorganic fillers, emulsifiers, foaming aids, foam stabilizers, rheological additives, water scavengers, thioxotropic agents, flame retardants, defoamers, deaerators, film-forming polymers, antimicrobial substances, preservative substances, antioxidants, dyes, colorants, pigments, antifreezes, fungicides, adhesion promoters, reactive diluents, plasticizers, complexing agents, spraying aids, wetting agents, vitamins, growth substances, hormones, fragrances, light stabilizers, free-radical scavengers, UV absorbers, further stabilizers, and catalysts.

14. A method comprising:
utilizing the composition of claim 1 as a base material to produce at least one item selected from the group consisting of adhesives, surface coatings, surface modifications, reactive crosslinkers, adhesion promoters, spreaders, primers, binders, sealants, and particles.

15. An adhesive or sealant comprising:
the composition as claimed in claim 1.

16. A foamable adhesive or sealant comprising:
the composition as claimed in claim 1; and
a physical and/or chemically released blowing agent.

17. A process for bonding two surfaces, comprising:
utilizing the foamable adhesive or sealant as claimed in claim 16 to form a foam between the two surfaces to be bonded.

18. The method as claimed in claim 14;
wherein an adhesive and/or sealant is produced.

19. The process for bonding two surfaces as claims in claim 17;
wherein, after the foam is formed between the two surfaces to be bonded, the foam is then flattened between the two surfaces.

* * * * *